United States Patent

[11] 3,627,087

[72] Inventor Wade A. Eskridge
Overland Park, Kans.
[21] Appl. No. 883,466
[22] Filed Dec. 9, 1969
[45] Patented Dec. 14, 1971
[73] Assignee A. B. Chance Company
Centralia, Mo.

[54] ORBITING GEAR WINCH AND BRAKE THEREFOR
18 Claims, 8 Drawing Figs.

[52] U.S. Cl..................................................... 192/8,
74/805, 188/134, 254/150 R, 254/186 R
[51] Int. Cl.........................................................F16d 55/38,
F16d 59/02, B66d 5/12
[50] Field of Search............................................. 192/8, 144;
188/134, 167, 72.3; 254/186 R, 150 R; 74/805

[56] References Cited
UNITED STATES PATENTS

| | | | |
|---|---|---|---|
| 553,317 | 1/1896 | Richards | 74/805 |
| 724,663 | 4/1903 | Clennam | 254/186 R X |
| 2,783,861 | 3/1957 | Jungles | 192/8 |
| 2,997,146 | 8/1961 | Chiolerio | 192/8 |
| 3,052,138 | 9/1962 | Louton, Jr. et al. | 74/805 |
| 3,285,377 | 11/1966 | Rasmussen | 188/134 X |

FOREIGN PATENTS

| | | | |
|---|---|---|---|
| 1,251,741 | 12/1960 | France | 74/805 |

Primary Examiner—Allan D. Herrmann
Attorney—Schmidt, Johnson, Hovey & Williams

ABSTRACT: A gear apparatus and brake assembly for a power-operated winch having a rotatable winding drum are both completely contained within the drum. The gear apparatus includes an inner external toothed gear having first and second toothed sections which simultaneously engage first and second outer internal toothed ring gears, one of which is fixed and the other of which is secured to the rotatable winding drum. The two ring gears have different numbers of teeth, and the external toothed gear has fewer teeth than the least number of either one of the two ring gears. Thus, as an eccentric shaft moves the external toothed gear around the inside of the two ring gears in an orbital path, the movable ring gear and the rotatable winding drum coupled therewith are moved at a greatly reduced speed relative to the fixed ring gear.

The brake assembly is located at the input shaft of the apparatus to take advantage of the low torque value at this point. A plurality of side-by-side braking plates are provided in alignment with the drive shaft with certain ones being fixed against rotation while others are rotatable with the driven shaft of the gear apparatus. The plates are movable toward and away from each other and springs normally bias them into frictional interengagement to lock the driven shaft against rotation. Cam means in the form of a number of coupling pins interposed between the drive structure and the driven shaft are operable by the drive structure to remove the bias on the braking plates in response to rotation of the drive shaft when the drive is operated and to permit return movement of the cam pins to their initial positions within respective recesses therefor when the drive shaft ceases rotation whereby the spring bias on the braking plates causes the same to move back into braking disposition.

Patented Dec. 14, 1971
3,627,087
3 Sheets-Sheet 1
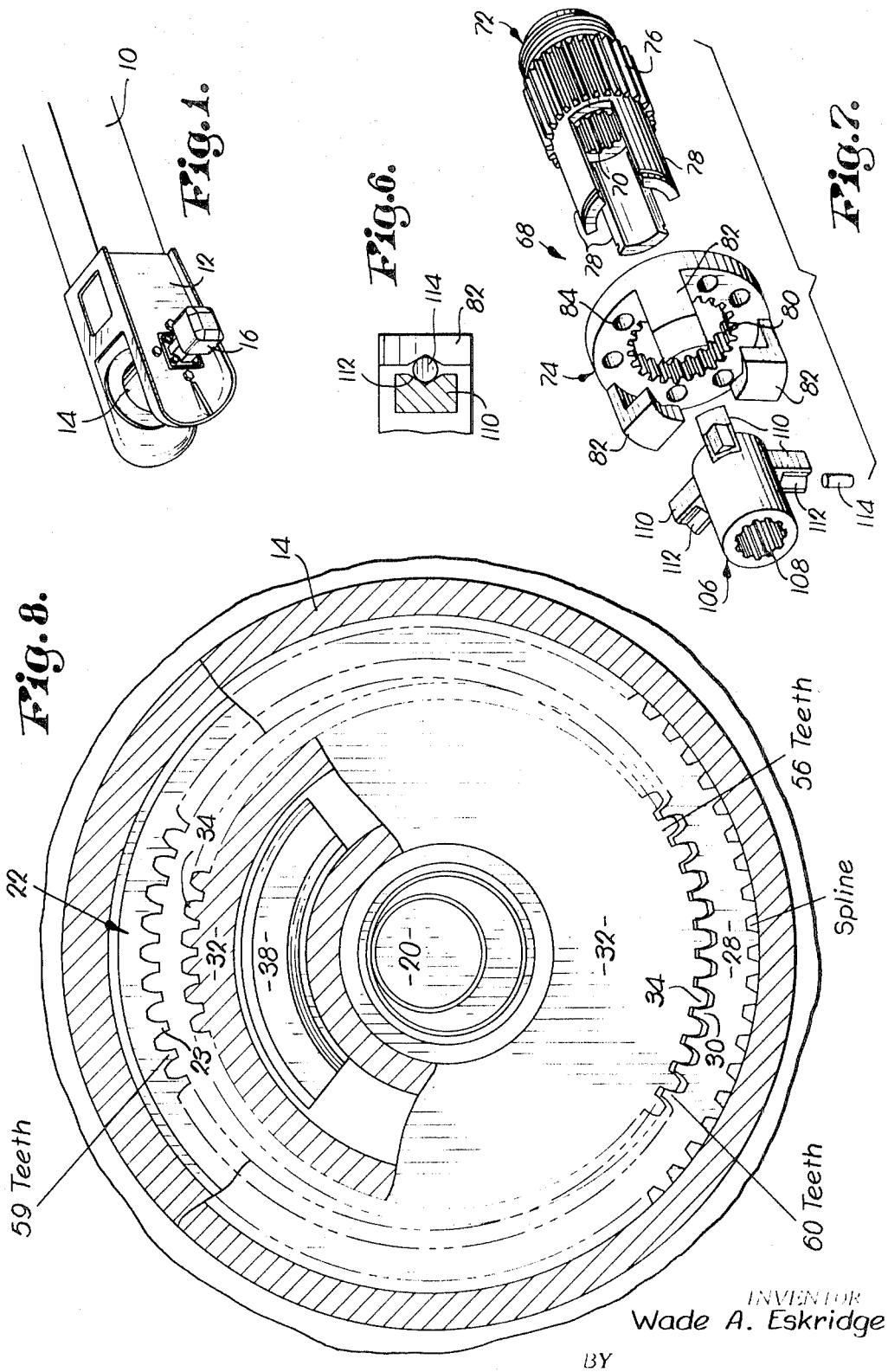
INVENTOR
Wade A. Eskridge
BY
Schmidt Johnson, Hovey
Williams & Chase
ATTORNEYS.

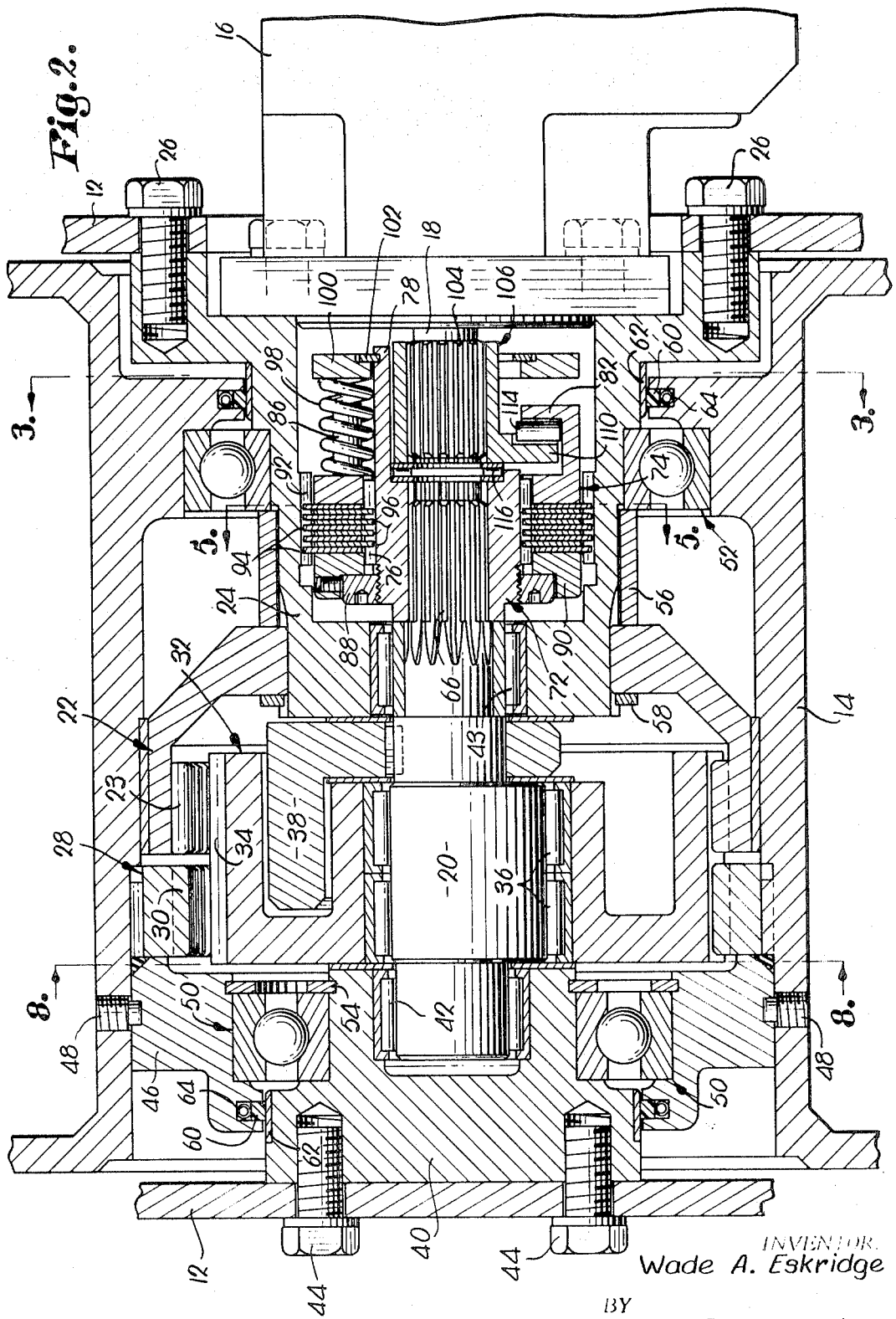

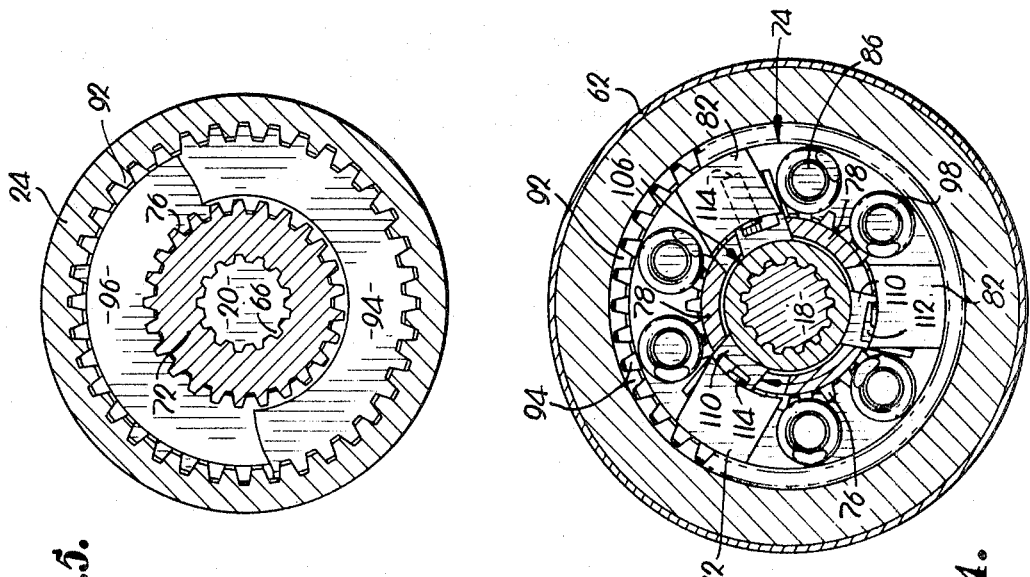
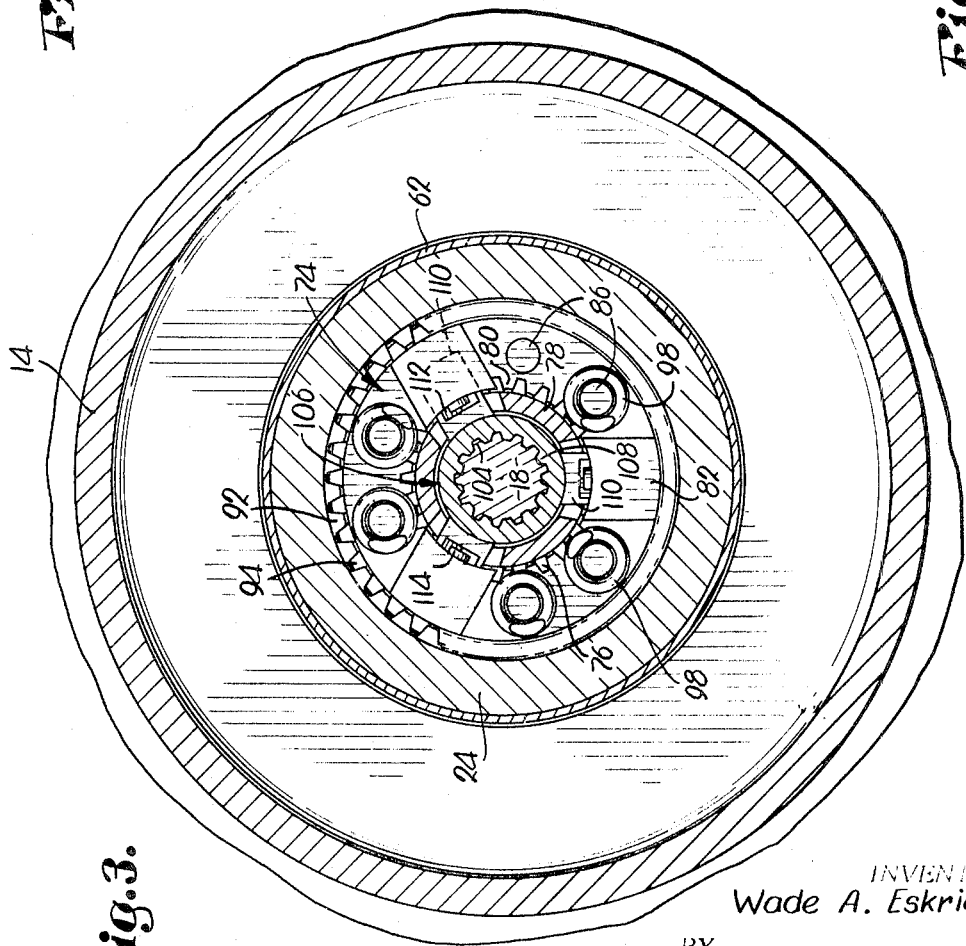

ORBITING GEAR WINCH AND BRAKE THEREFOR

This invention relates to power transmission devices and, more particularly, to a speed reduction gear apparatus and brake assembly for a rotatable member.

Prior power transmission devices for moving the winding drums of hoisting machines or winches have included worm gears, spur gears, helical gears, planetary gears, and orbiting gears. An essential requirement of any gear arrangement which finds application in a hoisting device is large speed reduction to obtain the necessary high torque. While some of the gear arrangements described above are capable of achieving the necessary high torque output, these same gears are hampered by low operating efficiency. Such low operating efficiency means that a considerable amount of energy is dissipated as heat, thus limiting the speed at which the winch or hoisting device can operate. While orbiting gears avoid the inefficiency problems of some of the gear arrangements, such orbiting gears have heretofore not been satisfactory in hoisting machine applications because of the relatively large amount of space required for their operation. Prior efforts to completely enclose the gearing mechanism within the winding drum of a winch have not met with success, although such an arrangement has obvious advantages because of its compact space-saving features.

A further problem encountered in hoisting machines which has heretofore not been satisfactorily solved is the provision of a braking assembly for holding a load in midair. When a hydraulic motor is utilized with an orbiting gear, a braking assembly is essential to prevent rotation of the winding drum when the fluid supply to the motor is discontinued. This latter problem is obviously not limited to hoisting machines but is present in many applications of hydraulic motors to power equipment. Ideally, a brake assembly for a gear train coupled with a hydraulic motor should be self-actuating whenever the motor ceases to rotate the drive shaft and self-releasing whenever the drive shaft commences rotation.

It is, therefore, an object of the present invention to provide a gear apparatus and brake assembly for a power-operated winch which are completely enclosed within the rotatable winch drum thereby resulting in a self-contained unit which is not subject to damage from objects with which the winch may come in contact.

Another object of the invention is to provide a gear apparatus and brake assembly as aforesaid wherein the compact unit permits the winch to be positioned between closely spaced electrical lines.

It is another object of the invention to provide a self-contained gear apparatus and brake assembly for a power-operated winch as described above wherein the need for a separate gear and brake housing is eliminated, thus reducing manufacturing costs.

Still another object of the invention is to provide a gear apparatus and brake assembly for a power-operated winch wherein an epicyclic gearing arrangement is utilized to provide increased operating efficiency and a self-actuated and self-releasing brake assembly is controlled by the drive shaft.

It is also an object of the present invention to provide a gear apparatus and brake assembly for a power-operated winch wherein an epicyclic gear arrangement provides for large speed reductions between input and output and a self-actuated brake is operable to effect braking at the point of lowest torque, namely, the input shaft, thereby reducing the physical requirements of the brake assembly.

It is another object of the invention to provide a gear apparatus and brake assembly as described above wherein the brake assembly is independently removable from the winding drum of a power winch for adjustment or replacement of parts.

Additionally, an object of the present invention is to provide a gear apparatus for a rotatable member wherein an epicyclic gear arrangement permits operation of the member at high speeds without excessive heat buildup.

Another object of the invention is to provide a gear apparatus as aforesaid wherein the epicyclic gear arrangement results in greatly increased operating speeds with the same amount of power used in less efficient gear arrangements.

A yet further object of the invention is to provide a gear apparatus for a rotatable member wherein the greatly increased efficiency resulting from an epicyclic gear arrangement permits operation of the member for moving heavy loads at low speeds without "chattering" which is an inherent problem with less efficient gear trains.

Still another object of the invention is to provide an epicyclic gear arrangement for moving a rotatable member wherein a single external toothed orbiting gear is of a width sufficient to simultaneously engage two internal toothed gears having different numbers of teeth, thereby minimizing the space required to achieve speed reduction and move one of the ring gears relative to the other.

A further object of the invention is to provide a self-actuated brake assembly for a rotatable member wherein cam means is operable by the drive structure to release the brake and also couples the structure with the driven shaft thereby assuring release of the brake before the drive structure commences to rotate the driven shaft.

An additional object of the invention is to provide a self-actuated brake assembly for a driven shaft wherein cam means is operable by a drive structure to disengage the brake and is spring biased to apply the brake when the drive shaft ceases rotation.

Still another object of the invention is to provide a self-actuated brake assembly as described above wherein the cam means, which also serves as a coupling between the drive and driven shafts, is operable upon either clockwise or counterclockwise rotation of the latter to disengage the brake assembly.

Referring to the drawings:

FIG. 1 is a perspective view of a power-driven winch carried on the end of an elevated boom;

FIG. 2 is an enlarged, vertical, cross-sectional view through the winding drum of the winch showing details of the gear drive and brake assembly;

FIG. 3 is a cross-sectional view taken along line 3—3 of FIG. 2;

FIG. 4 is a cross-sectional view taken slightly to the left of line 3—3 of FIG. 2 and showing the drive elements of the drive structure and coupling member respectively in interengagement as they would appear during rotation of the winding drum;

FIG. 5 is a cross-sectional view taken along line 5—5 of FIG. 2 and showing the interengageable braking components of the brake assembly;

FIG. 6 is an enlarged, fragmentary, horizontal cross-sectional view taken immediately above the coupling pin shown in FIG. 2 and illustrating the housing for the coupling pin defined by the coupling member and the drive structure;

FIG. 7 is an exploded perspective view of the two component parts of the coupling member which is connected to the driven shaft and the drive structure which is joined to the drive shaft along with the coupling pin which interconnects the structure with the member; and FIG. 8 is a cross-sectional view taken along line 8—8 of FIG. 2 with portions broken away to show details of the epicyclic gear apparatus.

A movable boom which is partially visible in FIG. 1 is designated by the numeral 10 and has a housing 12 at the end thereof which supports a rotatable member in the form of a winding drum 14 or sheave for a power-operated winch or hoisting machine. It is to be understood of course, that the winding drum 14 would normally have a length of cable (not shown) wound around its circumference, the cable serving to support the load which is being moved by the hoisting machine. The winding drum 14 is powered by a hydraulic motor 16 which rotates a drive shaft 18 (FIG. 2), the latter, in turn, rotating an eccentric shaft 20 through an appropriate coupling to be described hereinafter.

A fixed first internal toothed ring gear 22 having a plurality of teeth 23 is splined to an annular block forming a part of a cup-shaped support 24 which is secured to the housing 12 by bolts 26. A second axially aligned, internal toothed ring gear 28 having an internal diameter equal to the internal diameter of the ring gear 22 and provided with a plurality of teeth 30 is splined to the winding drum 14 in closely spaced relationship to the first gear 22. An external toothed spur gear 32 is disposed within the first and second gears 22 and 28 and is provided with a plurality of teeth 34 which present first and second toothed sections of equal external diameters having a combined width sufficient for simultaneous engagement with the first and second gears 22 and 28. The external toothed gear 32 is of generally U-shaped vertical cross section and is rotatably mounted on the eccentric shaft 20 by a plurality of roller bearings 36. The gear 32 is preferably provided with 56 teeth and the gears 22 and 28 are provided with 59 and 60 teeth respectively.

A counterbalance weight 38 is keyed to the eccentric shaft 20 and is disposed intermediate opposed portions of the gear 32. The end of the eccentric shaft 20 which is opposite the drive shaft 18 is supported within a block 40 by roller bearings 42. The other end of the driven shaft 20 is similarly supported within the housing block 24 by roller bearings 43. The block 40 is secured to the housing 12 by bolts 44. An annular support 46 held in place within drum 14 by setscrews 48 and supported by a ball bearing assembly 50, serves to rotatably mount one end of the drum 14 on the block 40. The other end of the drum 14 is rotatably mounted on the support 24 by a second ball bearing assembly 52. The bearing assembly 50 is held in place by an annular retainer ring 54, and the bearing assembly 52 is held in place by an annular spacer 56 which also abuts the ring gear 22 to prevent movement of the latter in one direction. The ring gear 22 is prevented from moving in the opposite direction by an annular retainer ring 58. The interior area defined by the drum 14, the annular support 46, and the block 40 is sealed at opposite ends by a pair of sealing rings 60 which engage a pair of sleeves 62 carried by the blocks 24 and 40, the rings 60 being held in tight fluid-sealing engagement with the surfaces of block 40 and support 24 by circumscribing resilient rings rings 64.

The driven eccentric shaft 20 is provided with a plurality of spline teeth 66 at one end thereof which are in complemental engagement with internal spline teeth 70 of a first component 72 of a coupling member designated generally by the numeral 68. The coupling 68 also includes a second component 74 in the form of an annular member. As best illustrated in FIG. 7, the first component 72 comprises a sleeve provided with external spline teeth 76 and includes a first drive element in the form of first, second and third fingerlike projections 78 which extend in spaced, parallel surrounding relationship to the drive shaft 18. The annular component 74 is provided with internal spline teeth 80 for complemental engagement with the external spline teeth 76 on the first component 72. One side of the annular ring presented by the component 74 defines a brake-actuating surface and the component 74 also includes first, second and third L-shaped components 82 for purposes to be made clear hereinafter. A plurality of openings 84 in the annular ring presented by the component 74 are opposite the brake-actuating surface and each receives a support pin 86.

The end of the sleeve presented by the first component 72 which is opposite the projections 78, threadably receives an annular support ring 88 (FIG. 2) which, in turn, supports an annular stop ring 90. The cup-shaped housing and support 24 is provided with internal spline teeth 92 which rigidly support a nonrotatable first braking component in the nature of a plurality of annular rings 94 which present a plurality of first braking plates. The rings 94 are provided with external spline teeth which engage the spline teeth 92 and prevent rotation of the rings 94. The external spline teeth 76 of the first component 72 engage internal spline teeth on a second brake component in the form of annular rings 96 which present a plurality of second braking plates. The splined arrangement of the rings 94 with the support 24 and the rings 96 with the first component 72 is clearly illustrated in FIG. 5 with the rings 94 alternating with rings 96 along the length of the supports therefor. The brake-actuating surface of the component 74 is biased against the adjacent ring 94 of the first braking component by yieldable means in the nature of a plurality of coil springs 98 carried by the support pins 86 and one of which is visible in FIG. 2. The ends of each of the coil springs 98 which are opposite the component 74 are biased against an annular backing plate 100 which is carried by the projections 78 and held in place by a retaining ring 102 thereon.

As illustrated in FIG. 2, the drive shaft 18 is provided with external spline teeth 104 which support a drive structure 106 in the form of an elongated sleeve provided with internal spline teeth 108 (FIG. 7) which are in complemental engagement with the spline teeth 104. The sleeve presented by the drive structure 106 normally surrounds the drive shaft 18 and is provided with a second drive element in the form of first, second and third ears 110, each of which presents a unitary body and includes a recess-defining portion 112. Each of the unitary bodies presented by the ears 110 and the recess-defining portions 112 has a surface which extends transversely of the drive shaft 18 with a V-shaped recess therein defined in part by opposed inclined faces each of which is disposed at an angle relative to the surface.

Cam means in the form of a plurality of cylindrical rollers 114, one of which is visible in each of FIGS. 2 and 7, are interposed between the component 74 of the coupling 68 and the ears 110 of the drive structure 106. The rollers 114 are disposed within the respective recesses presented by recess portions 112 and function as coupling pins between the drive structure 106 and the coupling 68. The L-shaped components 82 serve as retainer means for maintaining the rollers 114 within their respective recesses and cooperate with the respective recess-defining portions 112 to define a housing for each of the rollers 114 as best illustrated in FIG. 6. Each of the L-shaped components 82 has one leg disposed perpendicular to the drive shaft 18 and is provided with a V-shaped recess therein which is complemental to the V-shaped recess presented by the inclined faces of the transversely extending surface of a respective ear 110. The other leg of each of the L-shaped components 82 is in parallel relationship to the drive shaft 18 and serves to connect the first-mentioned leg with the annular ring of the second component 74. A thrust bearing 116 is interposed between the sleeve presented by the first component 72 of the coupling 68 and the drive structure 106 to maintain the latter in spaced relationship to the former while permitting relative rotational movement of the same.

In operation, the coil springs 98 normally bias the brake-actuating surface which is disposed adjacent one of the annular rings 94 of the first brake component into engagement with the latter. This in turn, forces the rings 94 of the first brake component into frictional engagement with the rings 96 of the second brake component to preclude rotation of the coupling 68 and thereby the driven shaft 20 relative to the drive structure 106 and drive shaft 18. In this regard, it will be appreciated that by virtue of the threaded connection between the ring 88 and the first component 72, the stop member presented by rings 88 and 90 may be moved as necessary in the direction of the braking components to accommodate wear therein to assure tight interengagement of the same when biased by the coil spring 98 to preclude rotation of the driven shaft 20.

The first and second braking components are shiftable into and out of such tight interengagement that relative rotation therebetween is precluded and such shifting occurs as a result of hydraulic fluid being supplied to the motor 16 and the drive shaft 18 moving through a predetermined displacement relative to the driven shaft 20. As best illustrated in FIG. 3, the projections 78 which make up the first drive element are disposed intermediate each pair of ears 110 which comprise the second drive element. The three ears 110 are disposed in equally circumferentially spaced, radially extending, relationship about the sleeve of the drive structure 106 as are the recess-defining portions 112 which are a unitary part of the body which present the ears 110. Thus, each of the ears 110 has first and second projections 78 disposed on opposite sides thereof and normally spaced therefrom. As the drive shaft 18 commences to rotate in either a clockwise or counterclockwise direction, each of the cylindrical rollers 114 is moved in the same direction by a respective inclined face in the recess portion of the respective body which defines each of the ears 110. This can best be understood by viewing FIG. 6. As each roller 114 is shifted and thereby forced to move upwardly along the inclined face of the corresponding recess-defining portion 112, it is also in engagement with one of the respective inclined faces presented by the V-shaped recess in the retainer component 82. Thus, as the rollers 114 attempt to move out of their housings, the second component 74 is moved away from the drive structure 106 and the brake-actuating surface is moved away from the braking plate presented by one of the annular rings 94 of the first braking component, against the action of the coil springs 98, thereby removing the braking bias on the braking plates presented by the annular rings 94 and 96 of the first and second braking components. The spacing between the projections 78 and the ears 110 is such that the brake components are permitted to move relatively out of braking engagement as the drive structure 106 is rotated relative to the driven shaft 20 through this predetermined displacement and before the ears 110 of the structure move into driving engagement with the projections 78 of the first drive element.

The ears 110 are illustrated in driving engagement with projections 78 in FIG. 4. As long as the ears 110 remain in driving engagement with the projections 78 the rollers 114, which actually serve as coupling pins between the drive and driven shafts, are biased to the extreme end of their housings and thus maintain the braking surface out of engagement with the annular braking ring 94, thereby assuring that the first and second braking components remain out of braking engagement as long as the drive shaft 18 continues to rotate.

As the eccentric shaft 20 is rotated, the external toothed gear 32 is moved in an orbital path around the inside of the first and second internal toothed gears 22 and 28, the gear 32 moving about its own axis in the opposite direction to the direction of rotation of the shaft 20. Since there is a one tooth difference between the number of teeth 23 on the ring gear 22 and the number of teeth 30 on the ring gear 28, the rotatable gear 28 moves relative to the gear 22 through an annular displacement equal to the thickness of one tooth plus the space between a pair of successive teeth for each revolution of the shaft 20. The ratio of annular movement between the eccentric shaft 20 and the ring gear 28 is equal to the number of teeth in the latter divided by one, i.e., 59:1. Since the gear 28 is connected to the rotatable drum 14, the output torque to the drum 14 is 59 times the input torque applied to the shaft 20, diminished by the efficiency loss in the gear train. It has been found that the efficiency of such a system is between 92 percent and 94 percent thereby allowing the unit to be operated almost continuously without danger of overheating.

Because the teeth 34 of the gear 32 are required to engage both the teeth 23 and the teeth 30, the teeth 34 are of a thickness equal to the thickness of the teeth on only one of the gears 22 or 28. This is preferably the rotatable ring gear 28. Also, while a one tooth difference between the first ring gear 22 and the rotatable ring gear 28 has been illustrated in the drawings, it is to be understood that this difference could vary over a reasonable range and that either the fixed gear 22 or the rotatable gear 28 can have the fewer number of teeth. Furthermore, while a three teeth difference between the number of teeth on the ring gear 22 with the fewest number of teeth and the external toothed gear 32 has been illustrated, this difference could also vary over a reasonable range. It is apparent that the counterbalance 38 serves to reduce the vibrational forces resulting from the rotation of the eccentric shaft 20 and assures a smooth operation regardless of the differences in the number of teeth on the gears 22, 28 and 32.

When the supply of fluid to the hydraulic motor 16 is discontinued, rotation of the drive shaft 18 immediately ceases and the coil springs 98 bias the rollers 114 back to the bottom of the recess-defining portions 112 thereby permitting the second component 74 to move toward the drive structure 106 and bring the annular rings 94 and 96 which surround the driven eccentric shaft 20 and define the braking plates into interengagement to brake the shaft 20. This, of course, prevents further rotation of the winding drum 14.

While the gear apparatus of the invention has been particularly described with reference to a winch, it will be appreciated that it will find application for moving a rotatable member in numerous other devices. Similarly, the brake assembly of the invention is adapted to be coupled with any rotatable drive shaft and is actuatable thereby to apply the brake when the shaft ceases rotation and release the brake when the shaft commences rotation. The location of the brake assembly at the point of lowest torque in the system, namely, the input shaft 18, has obvious advantages in requiring minimal braking effort. The brake assembly has particular advantages when coupled with a drive shaft to which power is supplied by a hydraulic motor since such motors inherently have a certain amount of leakage which necessitates the provision of auxiliary brake mechanism. For example, it is contemplated that the brake assembly of the present invention will find application in heavy earth-moving equipment and similar machinery.

Having thus described the invention, what is claimed as new and desired to be secured by Letters Patent is:

1. In a power-operated winch having a rotatable winding drum and a drive shaft for rotating the drum, the combination with said drum and said shaft of:

a fixed first internal toothed gear disposed within said drum;
a second internal toothed gear disposed within said drum and coupled with the latter,
said second gear having a different number of teeth than the number of teeth on said first gear;
an external toothed gear disposed within said first and second gears and having first and second sections for simultaneous engagement with said first and second gears;
an eccentric shaft for moving said external toothed gear in an orbital path around said first and second gears,
said external toothed gear being rotatably mounted on said eccentric shaft;
a coupling member connected to said eccentric shaft and provided with a first drive element thereon;
drive structure joined to said drive shaft for rotation therewith and provided with a second drive element normally spaced from said first drive element but movable into engagement therewith after said structure has been rotated relative to said eccentric shaft through a predetermined displacement, said drive structure including a recess-defining portion;
a nonrotatable first brake component adjacent said coupling member;
a second brake component carried by said coupling member in disposition for engaging said first brake component,
said first and second brake components being shiftable into and out of interengagement;
means for normally biasing one of said components into engagement with the other of of said components to preclude rotation of said coupling member and thereby the driven shaft relative to said drive structure and thereby the drive shaft;
cam means including a coupling pin within said recess-defining portion and interposed between said drive structure and said coupling member,
said member including retainer means for maintaining said coupling pin within said recess-defining portion,
said retainer means having a section defining a brake actuating surface disposed adjacent one of said brake components; and yieldable means for biasing said brake-actuating surface against said one component, said cam means being movable by the drive structure for moving said first and second brake components out of braking engagement before said second drive element moves into driving engagement with said first drive element and thus release the brake before the driven shaft is rotated by the drive shaft upon interengagement of said first and second drive elements.

2. Apparatus as set forth in claim 1, wherein said first and second ring gears are of equal internal diameter and said first and second sections are of equal external diameter to present a plurality of teeth having a width sufficient to engage both of said first and second gears.

3. The combination with the drive and driven shafts of a motor-operated gear unit, of a brake assembly comprising:
   a coupling member connected to the driven shaft and provided with a first drive element thereon;
   drive structure joined to the drive shaft for rotation therewith and provided with a second drive element normally spaced from said first drive element but movable into engagement therewith after said structure has been rotated relative to the driven shaft through a predetermined displacement, said structure being provided with a recess-defining portion;
   a nonrotatable first brake component adjacent said coupling member;
   a second brake component carried by said coupling member in disposition for engaging said first brake component,
   said first and second brake components being shiftable into and out of interengagement;
   means for normally biasing one of said components into engagement with the other of said components to preclude rotation of said coupling member and thereby the driven shaft relative to said drive structure and thereby the drive shaft;
   cam means including a coupling pin within said recess-defining portion and interposed between said drive structure and said coupling member,
   said member including retainer means for maintaining said coupling pin within said recess-defining portion,
   said retainer means having a section defining a brake-actuating surface disposed adjacent one of said brake components; and
   yieldable means for biasing said brake-actuating surface against said one component, said cam means being movable by the drive structure for moving said first and second brake components out of braking engagement before said second drive element moves into driving engagement with said first drive element and thus release the brake before the driven shaft is rotated by the drive shaft upon interengagement of said first and second drive elements.

4. Apparatus as set forth in claim 3,
   said first brake component comprising a plurality of first braking plates,
   said second brake component comprising a plurality of second braking plates each disposed intermediate a respective pair of first braking plates.

5. Apparatus as set forth in claim 3; and
   a stop member against which one of said braking plates is biased when said first and second brake components are biased into interengagement,
   said stop member being movable in the direction of said one plate to accommodate wear in said plates.

6. Apparatus as set forth in claim 3,
   said first and second braking plates comprising a plurality of annular rings disposed in surrounding relationship to said driven shaft.

7. Apparatus as set forth in claim 3,
   said first drive element including a first projection extending in parallel relationship to the drive shaft,
   said second drive element comprising an ear extending perpendicular to said drive shaft.

8. Apparatus as set forth in claim 7,
   said recess-defining portion and said retainer means cooperating to define a housing for said coupling pin,
   said housing having at least one inclined surface disposed to cause said brake-actuating surface to be moved away from said one braking component against the action of said yieldable means when said drive shaft and thereby said structure are rotated through said predetermined displacement.

9. Apparatus as set forth in claim 8,
   said first drive element further including a second projection extending in parallel relationship to the drive shaft,
   said first and second projections being disposed on opposite sides of said ear, each in spaced relationship therefrom a respective distance equal to said normal space.

10. Apparatus as set forth in claim 9,
    said second drive element further comprising a plurality of said ears extending perpendicular to said drive shaft,
    said first drive element further including a plurality of projections extending in spaced, parallel, surrounding relationship to the drive shaft intermediate each pair of said ears.

11. Apparatus as set forth in claim 10,
    said drive structure comprising a sleeve which surrounds said drive shaft,
    said second drive element including at least three of said ears disposed in equally spaced radial relationship about said sleeve,
    said structure including at least three of said recess-defining portions disposed in equally spaced radial relationship about said sleeve,
    at least three of said coupling pins being disposed in the respective recesses,
    each of said ears and each of said recess-defining portions presenting a unitary body,
    each of said bodies having a surface which extends transversely of said shaft,
    each of said surfaces having a recess therein defined in part by an inclined face disposed at an angle relative to the surface,
    said member including a plurality of said retainer means.

12. A brake assembly for a driven shaft adapted to be coupled with a rotatable drive shaft and actuatable thereby to apply the brake when the shaft ceases rotation and release the brake when the shaft commences rotation, said assembly comprising:
    a coupling member connected to the driven shaft and provided with a first drive element thereon;
    drive structure joined to the drive shaft for rotation therewith and provided with a second drive element normally spaced from said first drive element but movable into engagement therewith after said structure has been rotated relative to the driven shaft through a predetermined displacement,
    said second drive element including a recess-defining portion;
    a nonrotatable first brake component adjacent said coupling member;
    a second brake component carried by said coupling member in disposition for engaging said first brake component,
    said first and second brake components being shiftable into and out of interengagement,
    a coupling pin disposed within said recess-defining portion,
    said member including retainer means for maintaining said coupling pin within said recess-defining portion and permitting movement of the latter relative to said retainer means,
    said retainer means having a section defining a brake-actuating surface disposed adjacent one of said brake components; and
    yieldable means for biasing said brake-actuating surface against said one component to bring the latter into engagement with the other component to brake said driven shaft when said drive shaft ceases rotation, said coupling pin being movable by said drive structure to move said brake components out of braking engagement before said second drive element moves into driving engagement with said first drive element and thus release the brake before the driven shaft is rotated by the drive shaft upon interengagement of said first and second drive elements.

13. Apparatus as set forth in claim 12,
said recess-defining portion and said retainer means cooperating to define a housing for said coupling pin,
said housing having at least one inclined face disposed to cause said brake-actuating surface to be moved away from said one braking component against the action of said yieldable means when said drive shaft and thereby said structure are rotated through said predetermined displacement.

14. Apparatus as set forth in claim 13,
said second drive element comprising a plurality of ears extending perpendicular to said drive shaft,
each of said ears presenting a recess,
said first drive element comprising a sleeve positioned over said driven shaft and including a plurality of projections extending in parallel relationship to said drive shaft,
each of said projections being positioned intermediate each pair of said ears and spaced from the latter a distance equal to said normal spacing,
a plurality of said coupling pins being disposed in said sockets,
said member including a plurality of said retainer means,
said housing having a pair of oppositely inclined faces disposed to cause said brake-actuating surface to be moved away from said one braking component in response to either clockwise or counterclockwise rotation of said drive shaft through said predetermined displacement.

15. Apparatus as set forth in claim 14,
said retainer means including a plurality of L-shaped components each having one leg disposed perpendicular to said drive shaft in complemental relationship to said ears,
the other leg of each L-shaped component extending in parallel relationship to said drive shaft, and
an annular member carried by said first drive element and presenting said brake-actuating surface,
each of said other legs being rigid with said annular member.

16. Apparatus as set forth in claim 15,
each of said one legs having a V-shaped recess therein which complement said oppositely inclined faces.

17. Apparatus as set forth in claim 15,
said annular member having a plurality of openings therein;
a plurality of support pins disposed in said openings,
said yieldable means comprising a plurality of coil springs disposed in surrounding relationship to said support pins; and
a backing plate carried by said projections and restraining the ends of said coil springs which are opposite said braking surface.

18. Apparatus as set forth in claim 13, each of said coupling pins comprising a cylindrical roller.

* * * * *